US012523539B2

(12) United States Patent
Moretti et al.

(10) Patent No.: US 12,523,539 B2
(45) Date of Patent: Jan. 13, 2026

(54) MONITORING SYSTEM FOR BELTED UNDERCARRIAGE

(71) Applicant: ITALTRACTOR ITM S.P.A., Valsamoggia-Localita Crespellano (IT)

(72) Inventors: Nicolas Moretti, Verghereto (IT); Eustachio Calia, Matera (IT)

(73) Assignee: ITALTRACTOR ITM S.p.A., Valsamoggia Localita Crespellano (IT)

( * ) Notice: Subject to any disclaimer, the term of this patent is extended or adjusted under 35 U.S.C. 154(b) by 565 days.

(21) Appl. No.: 17/756,607

(22) PCT Filed: Nov. 27, 2020

(86) PCT No.: PCT/IB2020/061210
§ 371 (c)(1),
(2) Date: May 27, 2022

(87) PCT Pub. No.: WO2021/105938
PCT Pub. Date: Jun. 3, 2021

(65) Prior Publication Data
US 2022/0412809 A1    Dec. 29, 2022

(30) Foreign Application Priority Data
Nov. 29, 2019   (IT) .......................... 102019000022590

(51) Int. Cl.
*G01K 1/14* (2021.01)
*B62D 55/14* (2006.01)
(Continued)

(52) U.S. Cl.
CPC ............... *G01K 1/14* (2013.01); *G01K 1/024* (2013.01); *G01K 1/026* (2013.01); *G01K 7/16* (2013.01); *B62D 55/14* (2013.01)

(58) Field of Classification Search
CPC ................... G01K 3/14; G01K 1/14; G01K 1/024; G01K 1/026; G01K 7/16; B62D 55/14;
(Continued)

(56) References Cited

U.S. PATENT DOCUMENTS

2013/0255354 A1\* 10/2013 Hawkins .................. G01N 3/56
                                                            305/15
2015/0337522 A1\* 11/2015 Diekevers ................ E02F 9/26
                                                            701/33.9
(Continued)

FOREIGN PATENT DOCUMENTS

CN    205345102 U    6/2016
CN    106573656 A    4/2017
(Continued)

OTHER PUBLICATIONS

Chinese Official Action dated Apr. 14, 2023, issued in corresponding Chinese application.
(Continued)

Primary Examiner — John E Breene
Assistant Examiner — Janice M Soto
(74) Attorney, Agent, or Firm — Husch Blackwell LLP

(57) ABSTRACT

A monitoring system of at least one physical magnitude in at least one undercarriage component, the system includes at least one sensor device arranged in an undercarriage component, the sensor device configured to detect the temperature inside the undercarriage component and to generate wireless measurement signals that include temperature representative data; a gateway that includes a gateway wireless transceiver; a central processing unit operatively connected to the gateway wireless transceiver and configured to receive and store the wireless measurement signals, and a wireless access point operatively connected to the central processing unit and configured to receive said wireless measurement (Continued)

signals stored in the central processing unit and to generate corresponding wireless measurement signals, the wireless access point acting as an entry point for accessing the temperature representative data detected by the at least one sensor device.

12 Claims, 6 Drawing Sheets

(51) Int. Cl.
    *G01K 1/02*         (2021.01)
    *G01K 1/024*      (2021.01)
    *G01K 7/16*         (2006.01)

(58) Field of Classification Search
    CPC ........ B62D 55/32; B62D 55/08; B62D 55/15; B62D 55/244; B62D 65/00; B62D 55/065; B62D 55/06; B62D 55/088; B62D 55/092; B62D 55/10; B62D 55/104; B62D 55/26; A01B 79/005; G01M 17/03; G01M 17/027; G07C 5/0808; G07C 5/008; G07C 5/0816; G07C 5/0825; B60C 11/246; B60K 28/10; B60K 35/00; E02F 9/267; F16D 2066/001; B60W 2050/146; B60W 2300/12; B60W 2556/45; B60W 30/143; B60W 30/146; B60W 30/18; B60W 40/06; B60W 40/12; B60W 50/14; G05D 1/0212; G06T 2207/20081; G06T 2207/20084; G06T 2207/30252; G06T 7/001; G06V 20/56
    See application file for complete search history.

(56) References Cited

U.S. PATENT DOCUMENTS

| | | | |
|---|---|---|---|
| 2017/0106886 A1* | 4/2017 | Shubs, Jr. | ............ G05D 1/0022 |
| 2017/0261450 A1* | 9/2017 | Baarman | ................ G01N 25/72 |
| 2018/0086398 A1 | 3/2018 | Yoon et al. | |

FOREIGN PATENT DOCUMENTS

| | | | | |
|---|---|---|---|---|
| CN | 107041134 A | 8/2017 | | |
| CN | 107074309 A | 8/2017 | | |
| EP | 3248885 A1 * | 11/2017 | .......... | B64C 25/001 |
| EP | 3279064 A1 | 2/2018 | | |
| JP | 2018-516806 A | 6/2018 | | |
| KR | 1020160123908 A | 10/2016 | | |
| WO | 2016032793 A1 | 3/2016 | | |
| WO | 2016167500 A1 | 10/2016 | | |
| WO | 2019097556 A1 | 5/2019 | | |
| WO | 2020097556 A1 | 5/2020 | | |

OTHER PUBLICATIONS

Decision to Grant issued on Nov. 15, 2023 in corresponding Chinese Application No. 202080090929.1.
Machine Translation for CN205345102U.
Machine Translation for CN107074309A.
Machine Translation for CN107041134A.
Machine Translation for CN106573656A.
Japanese Office Action Dec. 3, 2024 for Japanese Application No. 2022-531502.

* cited by examiner

MONITORING SYSTEM FOR BELTED UNDERCARRIAGE

CROSS REFERENCES

This application is a U.S. National Phase Application of International Application No. PCT/IB2020/061210 filed on Nov. 27, 2020, which in turn claims priority to Italian Application No. 102019000022590 filed on Nov. 29, 2019, the disclosures of which are incorporated herein by reference in their entireties.

TECHNICAL FIELD

The present invention refers to a monitoring system of at least one physical quantity which comprises the temperature in at least one undercarriage component including a respective sensor device.

The present disclosure also refers to an undercarriage component which comprises a sensor device, in particular to a roller assembly.

BACKGROUND

Belted undercarriages are typically used in operating machines such as earthmoving machines, mining machines, demolition machines and the like, to allow the machine to be able to move on ground often uneven or with poor grip.

A belted undercarriage typically comprises two chain assemblies spaced apart and arranged parallel to each other and configured to receive a drive torque and transfer it to the ground. Each chain assembly comprises a plurality of undercarriage components which usually comprise a closed loop chain on a driving wheel and an idler wheel (or idler) operatively connected to a tensioner assembly. The undercarriage components further comprise, between the driving wheel and the idler wheel, a plurality of rollers configured to guide the chain during its motion. The rollers usually include one or more upper rollers and a plurality of lower rollers.

The chain usually comprises a plurality of links, with link it is referred to the single component of the chain which is articulated to the other components. Typically, each link comprises a pair of plates facing each other. The links are interconnected between them by pins. Each pin is usually inserted into holes provided on the plates and connects two links together.

Soles are usually mounted on the links which, being in direct contact with the ground, have the task of discharging the traction to the ground and increasing the contact surface between machine and ground. The type of sole used depends on the ground on which the machine must operate, on the conditions of the environment in which the machine must operate, and on the specifications suggested by the machine manufacturer.

The undercarriage is usually subjected to very severe operating conditions which may derive from the overall weight of the machine, the high powers transferred from the machine engine to the ground and/or the conformation and composition of the terrain on which the machine must operate. The components of the undercarriage are therefore subjected to high mechanical stress that can cause damage and wear to the components themselves.

Bushings are typically used as an external protection of the rollers or pins, to space the plates of the links one from another, or to engage the drive wheel and the idler wheel. Rollers are made of metal, typically of steel, and bushings are usually placed radially outside the shaft of the rollers to reduce friction between moving parts. The bushings are usually made of a non-ferrous metal, such as bronze, or of a bimetallic alloy and for this reason they are also referred to with the term "bronze bushings". A bushing arranged externally to the roller can rotate integrally with the roller around a shaft or be fixed with respect to the rotating roller. The bushings are typically lubricated to reduce friction between the contact surfaces of bushing and roller or bushing and shaft.

An inadequate lubrication increases the friction leading to wear of the bushing, the thickness of which gradually thins, until a damage to the roller or pin below and/or other elements of the chain is caused.

Since the wear of an undercarriage component often requires machine downtime in order to perform repairs or replacements, solutions have been developed to measure the state of wear of the components.

An indication of inadequate lubrication is the heat generated in the bushing and roller/pin due to the increase in the friction between the contact surfaces.

Application US 2018/0086398 relates to a belted assembly for a belted vehicle, which comprises a support shaft, a rotating roller fitted on the periphery of the support shaft and which rotates while supporting an inner side of a belt; a first detection unit arranged between the support shaft and the roller for measuring the number of rotations of the roller or the acceleration thereof; a second detection unit for measuring the temperature of a lubricant between the support shaft and the roller; a third detection unit arranged on the roller for measuring a state of wear of the roller; a communication unit for communicating to the outside the values measured by the detection units, and a receiving unit receives the measurements in wireless mode. A reservoir filled with a lubricant is provided between the support shaft and the roller and the second detection unit is a temperature sensor exposed to the reservoir with the lubricant.

Application US 2013/0255354 describes a monitoring device in an undercarriage assembly which has a roller assembly which includes a fixed roller component (shaft or housing) and a bushing. The monitoring device has two sensors which detect two distinct physical characteristics of the bushing. In one example, the monitoring device has a temperature sensor used to determine the state of the lubricant inside the roller assembly. The monitoring device may include a temperature sensor and a Hall effect sensor that produce output signals. The document mentions that output signals are transferred through a wireless transmitter to a computer or the data are accessed through a port that connects to the monitoring device.

WO 2016/032793 A1 relates to a link which comprises a wear sensor positioned in a cavity of the body of the link and configured to generate a signal indicative of a wear parameter of a surface of the link. A communication device receives the signal and transmits a corresponding signal to an onboard computer or an offboard computer.

WO 2019/097556 A1 in the name of the same Applicant concerns an element of a belted movement assembly which comprises at least one seat open towards the outside to house a wear sensor provided with a processing unit provided with a transceiver module, in which the transducer is of the consumable type and faces the outer surface subject to wear.

As indicated above, the rollers are subjected to strong mechanical stresses which lead to the wear thereof. In particular, the Applicant has observed that in the operations for moving large earth-moving machines some undercarriage components are subjected to strong stresses. A particularly critical undercarriage component is the lower roller which has the function of absorbing the loads transmitted by the machine as well as of guiding the chain. Typically, a large excavator is provided with a plurality of lower rollers, for example from 8 to 32. When the excavator is in motion, the lower rollers are subjected to rotation with a consequent significant increase in the temperature inside the rollers, which might reach critical values that can affect the functional integrity of these components.

In order to ensure a correct operation of the vehicle and at the same time minimize the number of machine downtimes, it would be important to be able to know in real time the temperature reached in the undercarriage components and in particular in the roller assemblies, such as the lower rollers, the upper rollers, or the idler roller.

One approach is to perform a periodic check of the temperature of the rollers by qualified personnel with close range temperature reading tools such as an infrared gun. These periodic inspections require, for obvious safety reasons, the interruption of the operation of the machine with a consequent, albeit limited, machine downtime necessary to perform the inspections.

The Applicant has observed that sending the measurement data from a detection unit of an undercarriage component directly to a remote station requires the presence in the component to be monitored of very expensive and often bulky transmission devices and/or relatively large batteries for powering such devices. In addition, belted vehicles, especially those large sized such as mining excavators, are often used in remote locations where a mobile connection to a cellular telecommunications network is lacking or unstable.

The Applicant has observed that a remote monitoring with respect to the vehicle, for example at a distance between 50 and 500 meters therefrom, in real time or in any case regular, of at least a physical quantity representative of the current state of one or more undercarriage components would allow an efficient management of the possible criticalities and a consequent timely intervention or planning thereof.

SUMMARY

The present invention relates to a monitoring system of at least one physical quantity in at least one undercarriage component and in particular of a plurality of undercarriage components, wherein the at least one physical quantity comprises the internal temperature of one or more undercarriage components.

In accordance with the present disclosure, a monitoring system of at least one physical quantity which comprises the temperature in at least one undercarriage component is provided, the system comprising:
  at least one sensor device arranged in a respective undercarriage component for a belted undercarriage of a vehicle, the sensor device being configured to detect the temperature inside the undercarriage component and to generate wireless measurement signals that include temperature representative data;
  a gateway that comprises:
  a gateway wireless transceiver for receiving wireless measurement signals from the at least one sensor device;
  a central processing unit operatively connected to the gateway wireless transceiver and configured to receive and store the measurement signals including temperature representative data associated with the at least one sensor device, and
  a wireless access point operatively connected to the central processing unit and configured to receive said measurement signals stored in the central processing unit and to generate corresponding wireless measurement signals, the wireless access point acting as an entry point for accessing the temperature representative data detected by the at least one sensor device.

For example, in accordance with the present disclosure, an operator who is at a distance from the belted vehicle, typically between 20 m and 500 m, can remotely view the data related to the current state of the monitored undercarriage components, by connecting a mobile terminal or a PC to the Wi-Fi® network created by the gateway mounted in the vehicle.

In the present context, short-range radio signals refer to radio signals with an action range of about 5 meters to about 20 meters.

In the present context, medium range radio signals refer to radio signals with an action range of about 20 meters to about 500 meters.

Preferably, the wireless measurement signals generated by the wireless access point are medium range radio signals with an action range of 20 meters to 500 meters.

Preferably, the wireless measurement signals generated by the wireless access point are Wi-Fi® signals.

Preferably, the wireless measurement signals generated by the at least one sensor device are short-range radio signals transmitted in broadcast mode without connection. Preferably, the radio signals are BLUETOOTH® signals, more preferably BLUETOOTH® Low Energy.

Preferably, the gateway wireless transceiver is configured to receive short-range radio signals, preferably BLUETOOTH®, more preferably BLUETOOTH® Low Energy.

Preferably, the gateway is arranged in the action range of the short-range signals generated by the at least one sensor device so as to allow the wireless gateway transceiver to receive the wireless measurement signals from the at least one sensor device.

Preferably, the gateway comprises a wireless cellular modem connected to the central processing unit and configured to receive the measurement signals from the central processing unit and to generate corresponding measurement signals at radio frequency for a mobile telecommunications network, the measurement signals including temperature representative data of the at least one undercarriage component.

Preferably, the at least one sensor device is a plurality of sensor devices arranged inside respective undercarriage components, each sensor device being configured to detect the temperature inside the respective undercarriage component and to generate wireless measurement signals including temperature representative data.

Typically, the at least one undercarriage component is arranged in a belted undercarriage and the gateway is arranged in a vehicle that comprises the belted undercarriage.

Preferably, the gateway comprises a CAN controller operatively connected to the central processing unit for the reception of data related to the temperature measured by the at least one sensor device and associated with the measurement signals that include temperature representative data stored in the central processing unit, the CAN controller being operatively connected to a communication network on board the vehicle.

Preferably, the sensor device comprises a temperature transducer housed in a first cavity arranged inside the undercarriage component and an electronic sensor module operatively connected to the temperature transducer which comprises a wireless transmitter configured to generate measurement signals in wireless mode that include temperature representative data.

Preferably, the monitoring system detects a wear parameter of the at least one undercarriage component, further to the temperature of said at least one undercarriage component.

Preferably, the sensor device is configured to detect, further to the temperature inside the undercarriage component, the wear of an outer surface of the undercarriage component, wherein the sensor device comprises a wear transducer arranged in the undercarriage component, wherein the wireless transmitter of the sensor device is configured to generate measurement signals in wireless mode that include representative data of a wear parameter and/or temperature representative data of the respective undercarriage component, and wherein the gateway wireless transceiver is configured for receiving wireless measurement signals including data representative of a wear parameter and/or temperature representative data.

Preferably, the wear transducer is housed in a second cavity obtained inside the undercarriage component, the wear transducer being operatively connected to the electronic sensor module, and wherein the second cavity has a first opening placed at an outer surface of the undercarriage component and the wear transducer comprises a first transducer end placed at the first opening of the second cavity.

In some embodiments, the undercarriage component is a roller assembly which comprises a roller body which comprises a central hole that axially crosses the roller body and is configured to receive a shaft, the first and second cavity being obtained inside the roller body, and wherein the electronic sensor module is arranged in a housing seat connected to the first cavity and to the second cavity for the operative connection with the temperature transducer and the wear transducer, respectively, and wherein the housing seat is obtained in the roller body as a recess that faces an opening of an outer surface of the roller body.

Preferably, the electronic sensor module comprises: circuit components, an electronic processor, a power supply source, and a wireless transmitter operatively connected to the electronic processor so as to receive respective measurement signals including data representative of temperature and possibly of a wear parameter, the wireless transmitter generating corresponding measurement signals in wireless mode that include data representative of temperature and possibly of a wear parameter.

Preferably, the electronic processor of the electronic sensor module is configured to receive measurement signals from the wear transducer, further to measurement signals from the temperature transducer.

The term "undercarriage component" means any component such as for example a link, a roller or a sole, of an undercarriage.

In preferred embodiments, the undercarriage component is a roller, in particular a lower roller of an undercarriage.

The terms "axial", "axially", "radial" and "radially" are used with reference to an undercarriage component of which at least one physical quantity is to be monitored.

In particular, the terms "axial" and "axially" mean references/quantities arranged/measured or extending in a longitudinal axis of the undercarriage component or in a direction substantially parallel to said longitudinal axis. The longitudinal axis is for example an axis of symmetry of the undercarriage component, for example an axis of symmetry of the roller.

The terms "radial" and "radially" mean references/quantities arranged/measured or extending in a direction perpendicular to the longitudinal axis of the undercarriage component.

The terms "radially inner/outer" mean respectively a position closer to or further away from the aforementioned longitudinal axis.

The expressions "radially inner" and "radially outer" are used to indicate a position closer and further away, respectively, along a radial direction with respect to the longitudinal axis of the undercarriage component.

The terms "axially internal/external" mean respectively a position closer and further away from a point of the undercarriage component along the longitudinal axis or along a direction parallel to said axis.

The term "transducer" means a device that is in direct interaction with the measured quantity, that is to say the first element of a measurement chain that converts a physical quantity into an electrical signal related to the measured quantity.

The term "wear" refers to the progressive loss of material from the surface of a body. When referred to an undercarriage component, it is meant the progressive loss of material from a surface of the undercarriage component.

BRIEF DESCRIPTION OF THE DRAWINGS

Further features and advantages of the invention will be more evident from the following description of preferred embodiments thereof made with reference to the appended drawings. In such drawings.

The same elements or elements with similar functions have been indicated with the same reference numbers in the different drawings.

DETAILED DESCRIPTION

Figure 1:
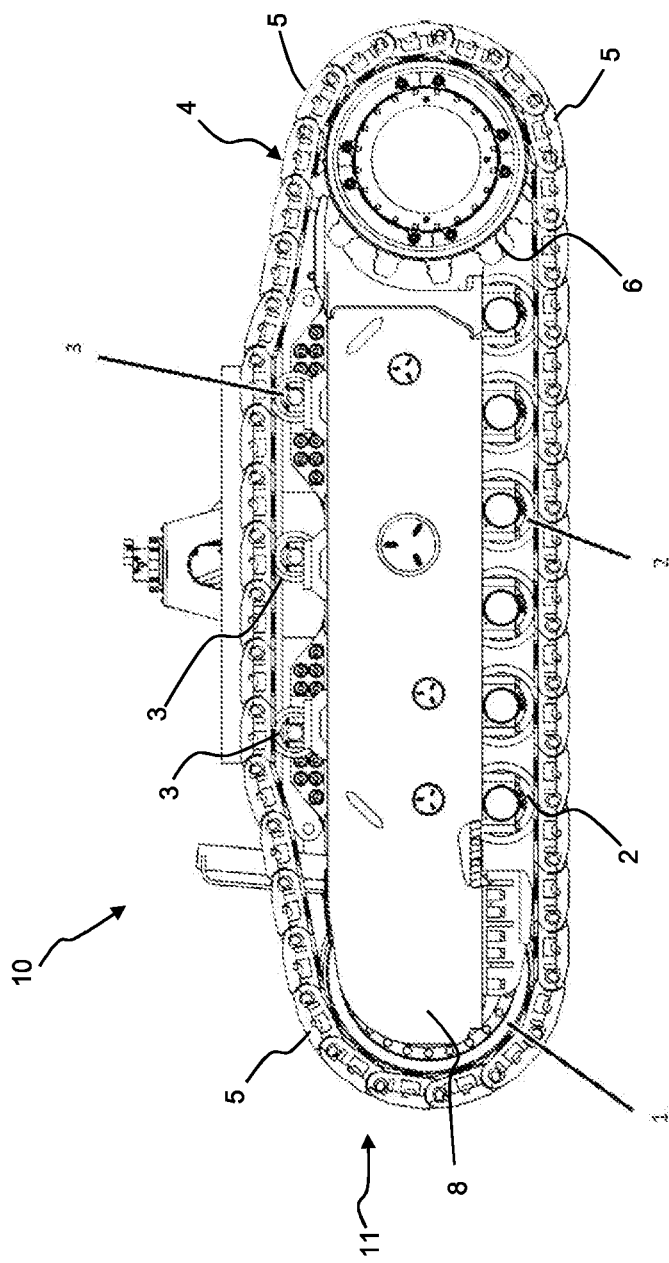
FIG. 1 is a schematic side view of a belted undercarriage.

FIG. 1 is a schematic side view showing some components of a typical belted undercarriage. The belted undercarriage 10 comprises two belt assemblies 11, of which only one is visible in the figure. Each belt assembly 11 comprises: a chain 4, which comprises a plurality of links 5 interconnected to each other by means of pins and bushings (not shown); a return wheel ("idler") 1, in the figure partially hidden by a casing 8, arranged anteriorly with respect to the direction of movement, and a drive wheel 6 arranged posteriorly with respect to the same direction. Between the return wheel 1 and the drive wheel 6, along the direction of movement of the undercarriage, a plurality of rollers 2, 3 are arranged, in particular one or more upper rollers 3 and a plurality of lower rollers 2 arranged in contact with the links 5 and adapted to guide the chain 4 in its motion. The lower rollers 2 are arranged in the lower portion of the belt assembly 11 and are designed to absorb the loads and discharge them at the bottom on an undercarriage frame (not visible in the figure). The upper rollers 3 are configured to guide the chain between the driving wheel 6 and the idler 1 and typically are present in a lower number than the number of the lower rollers. The number of the lower rollers 2 varies depending on the type of machine and the weight thereof.

In accordance with the present disclosure, at least one undercarriage component includes a sensor device for monitoring the temperature inside the component.

Figure 2:
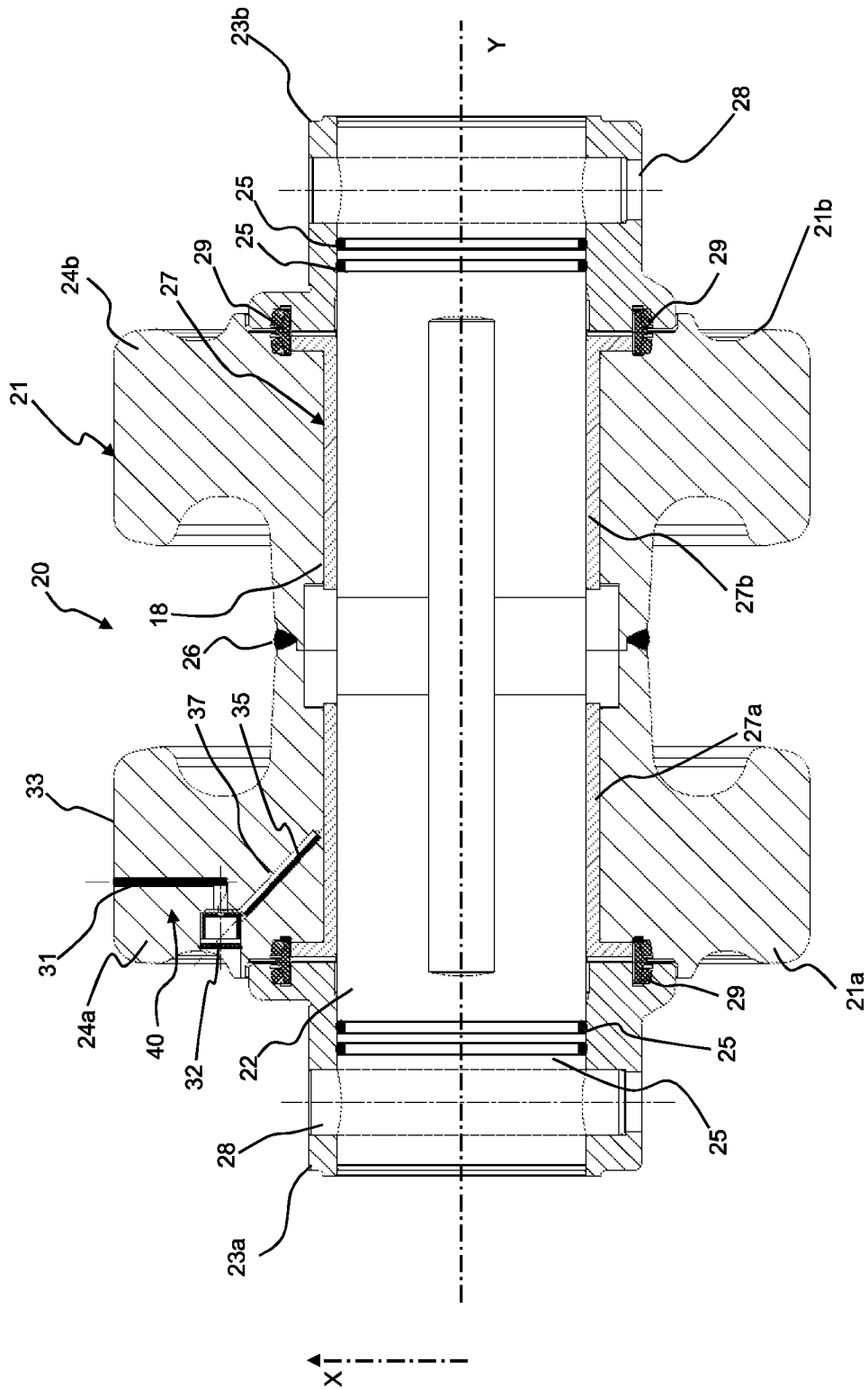
FIG. 2 is a sectional view of an undercarriage component that can be monitored by the monitoring system, in accordance with an embodiment.

FIG. 2 is a sectional view of an undercarriage component that can be monitored by the monitoring system, in accordance with an embodiment. In this embodiment the undercarriage component is a roller assembly, in particular a roller assembly of lower roller. The section plane is a longitudinal plane XY which comprises a longitudinal axis Y of the roller assembly, which in this case is a longitudinal development direction. In a typical operating position, the longitudinal plane XY is transverse to the links of the chain and therefore to the direction of movement of the belted undercarriage.

The roller assembly 20 comprises a roller body 21 which comprises a central cylindrical hole that axially crosses the roller body along the longitudinal axis Y and a shaft 22 which extends along the same axis Y for at least the entire length of the roller body 21 coaxially crosses the central cavity thereof. In the examples shown in FIGS. 2-4, the shaft 22 extends axially beyond the roller body 21 so that two respective end portions of the shaft are arranged axially externally with respect to the roller body 21.

The roller body 21 is delimited by a radially inner surface 18 with generally cylindrical shape which faces the shaft 22, in particular which faces the outer surface with generally cylindrical shape of the shaft 22.

The roller body 21 is a movable element that can rotate around the shaft 22 which is instead fixed with respect to the rotation movement and in general with respect to the undercarriage on which it is mounted. The longitudinal axis Y therefore defines the rotation axis of the roller body 21.

Each end portion of the shaft 22 is rigidly inserted in a respective closing element 23a, 23b integral with the shaft. Each closing element 23a, 23b comprises a respective seat 28 for the insertion of a pin for fixing the roller assembly 20 to the frame of the belted undercarriage (elements not shown).

The roller assembly 20 comprises at least one bushing 27 which is fitted on the outer surface of the shaft 22 so as to be interposed between the outer surface of the shaft 22 and the inner surface 18 of the roller body 21. The roller body is mechanically coupled to the shaft 22 through the at least one bushing 27, which acts as a bearing between the two surfaces to reduce the friction between them.

In the example, the roller body 21 comprises two flanges 24a, 24b which extend radially outwards. Alternatively, the roller body can comprise a single flange or a plurality of flanges.

Figure 3:
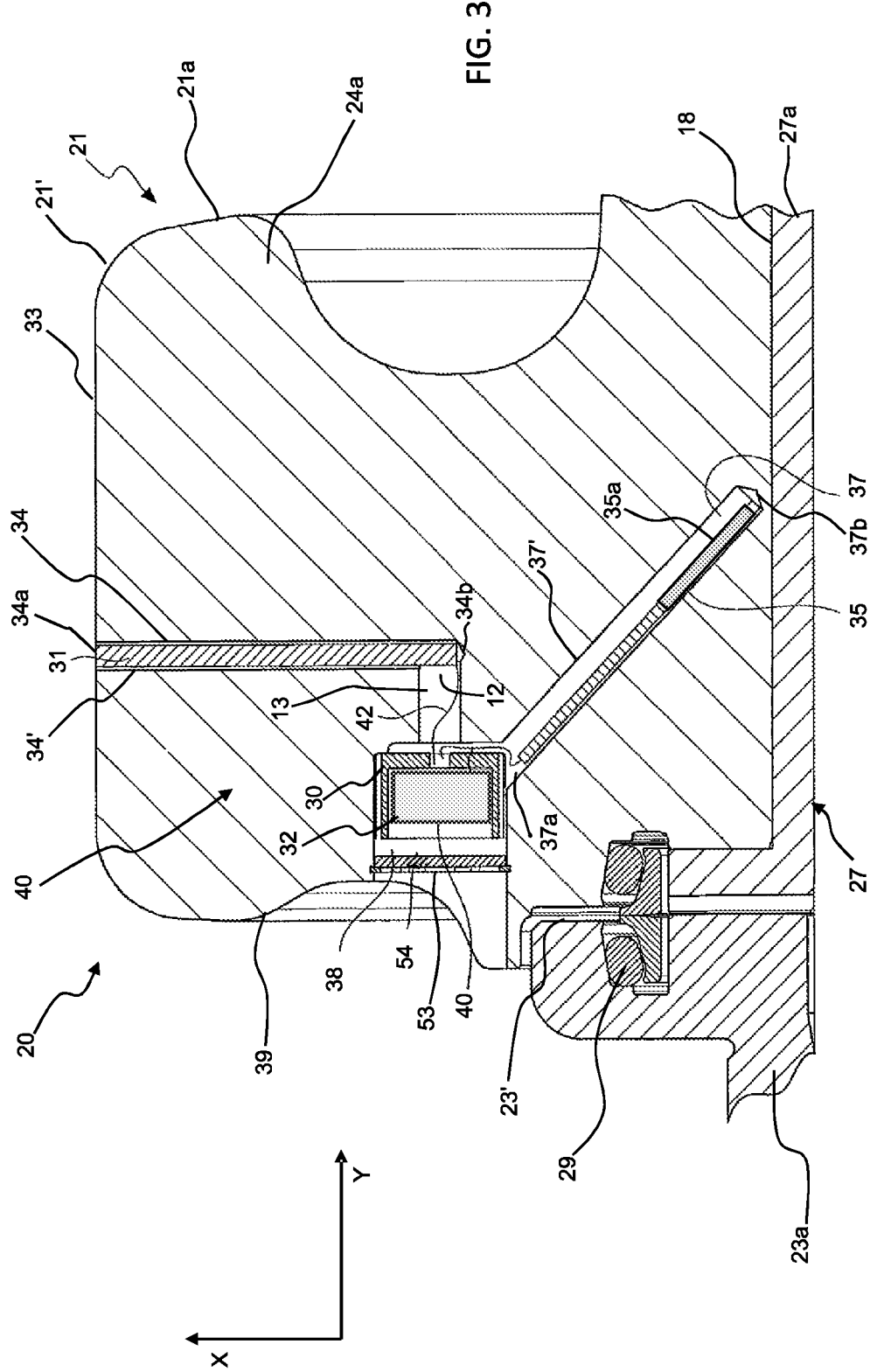
FIG. 3 is an enlarged view of a detail of the undercarriage component of FIG. 2 with some parts removed to show some details of the sensor device.
Figure 4:
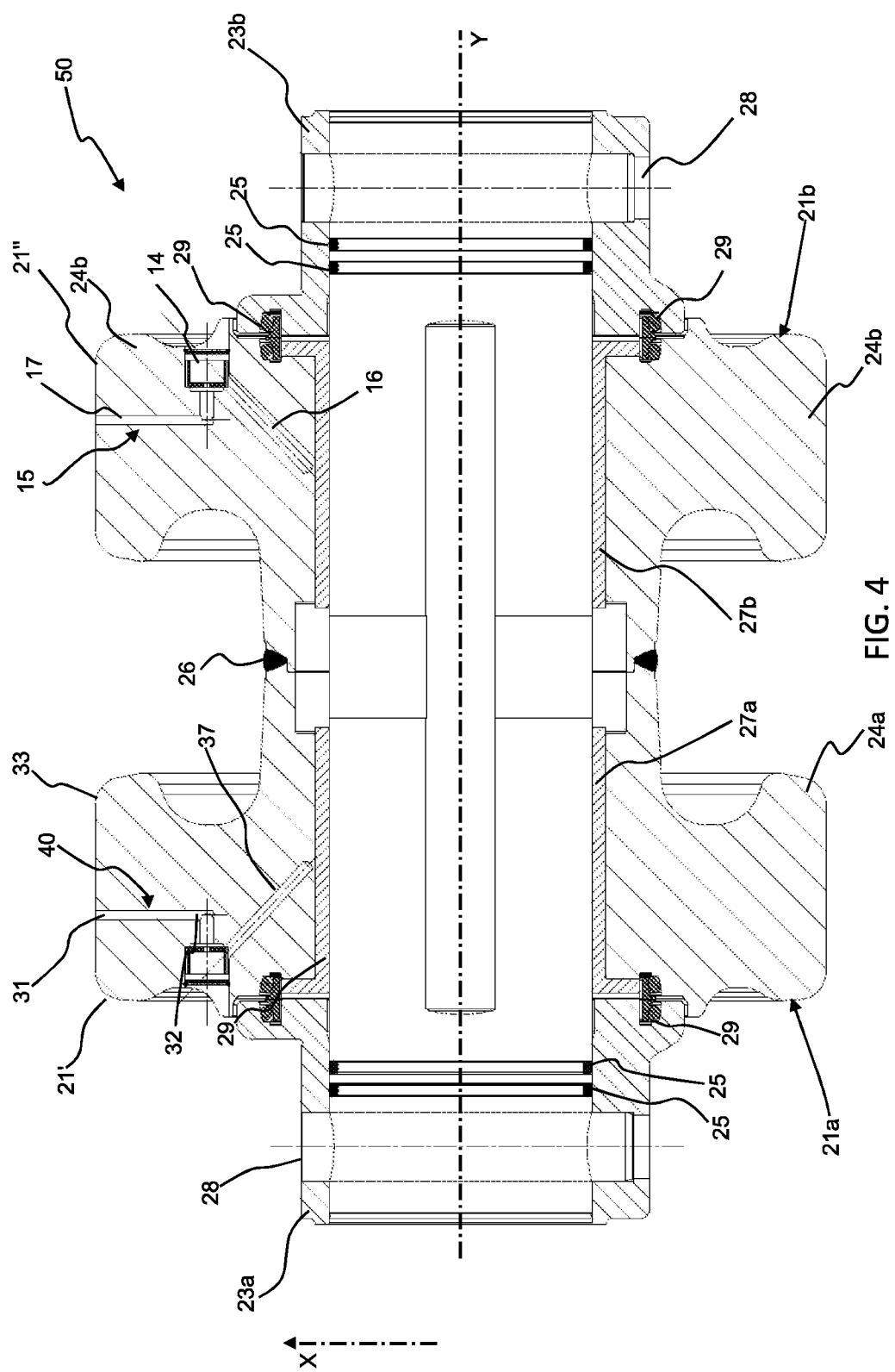
FIG. 4 is a sectional view of an undercarriage component that can be monitored by the monitoring system, in accordance with a further embodiment.

The roller body 21 can be made in one piece or, as in the example illustrated in FIGS. 2-4, be formed by joining two half-rollers 21a, 21b. The two half-rollers 21a, 21b are arranged in abutment along the longitudinal axis Y and joined together by means of a welding line 26. The roller body can be made of steel. Two bushings 27a, 27b are positioned at, along the longitudinal axis Y, each half-roller 21a, 21b.

It is understood that a single bushing extending along the direction Y can be interposed between the roller body and the shaft. The at least one bushing 27a, 27b can be made of steel, bronze, or bimetallic bronze-steel.

The at least one bushing 27a, 27b has a radially outer surface (not indicated) in contact with the radially inner surface 18 of the roller body 21a, 21b and a radially inner surface (not indicated) in contact with the outer surface of the shaft 22.

Inside the roller assembly 20 a lubricant is typically inserted, through a hole then closed with a plug, which fills an annular chamber (elements not visible in the figures) positioned between the inner surface of the roller body 21a, 21b and the outer surface of the bushing 27a, 27b. The lubricant allows reducing the friction in the rotation movement of the roller body on the outer surface of the bushing. Typically, the roller assembly 20 comprises sealing elements to prevent the lubricant from outflowing from the inside of the roller assembly and possibly prevent the entry of external agents which can be abrasive or corrosive. In the example illustrated in FIGS. 2-4, the roller assembly 20 comprises two assemblies of sealing rings 25, in particular a respective pair of O-rings 25, fitted on a respective end portion of the shaft 22.

In the example illustrated, each closing element 23a, 23b is mounted on the shaft 22 so that an axially inner lateral surface 23' of the respective closing element (FIG. 3) and extending radially (e.g. along the direction X) is arranged in abutment on a respective axially outer lateral surface of the roller body 21. Sealing elements 29 are arranged between the axially outer lateral surface of the roller body 21 and the axially inner lateral surface 23' of the respective closing element 23a, 23b.

The roller assembly 20 includes a sensor device 40 shown more in detail in FIG. 3. The sensor device 40 comprises a temperature transducer 35 for detecting the temperature inside the roller body 21. The temperature transducer 35 is arranged inside the roller body 21. The roller body 21 includes a first cavity 37 for housing in its inside the temperature transducer 35. The first cavity 37 is delimited by a lateral wall 37' which extends inside the roller body 21 along a cavity development axis.

The first cavity 37 is open at a first end 37a in the direction of the cavity extension axis for the insertion of the temperature transducer 35 and in general for the access to the cavity. In the figures, the first cavity 37 is connected to a housing seat 38 through the opening of the first end 37a (FIG. 3).

The housing seat 38 is configured to house an electronic sensor module 32 operatively and in particular physically connected to the temperature transducer 35. The electronic module 32 is configured for receiving signals from the temperature transducer 35 and for generating signals in wireless mode including temperature representative data.

The housing seat 38 is obtained in the roller body 21 as a recess that faces an opening of an outer surface of the roller body 21, in particular a first outer surface 39 of the roller body 21, in particular of the half-roller 21a (FIG. 3). The seat 38 can be for example parallelepiped or cylindrical. The first outer surface 39 is a lateral surface which generally extends radially along the axis X and is an axially outer surface of the roller body 21 (in the example of the half-roller 21a).

Preferably, the electronic sensor module 32 is inserted in a container 30 arranged inside the housing seat 38 for a greater protection of the circuit components and electronic devices included in the electronic module 32. For example, the container 30 is a synthetic rubber box (to absorb vibrations) with a front opening that faces the opening of the outer surface. The container 30 can be filled with an epoxy resin to further dampen external stresses and make the electronic sensor module leaktight.

Preferably, the opening of the first outer surface 39 is closed by a plug 54 of transparent material to the passage of the radio signals generated by the sensor module, wherein the plug is fixed by a seeger 53.

The first cavity 37 is obtained inside the roller body 21, in particular a half-roller 21*a*, so that a second end 37*b* thereof in the direction of the cavity extension axis and opposite to the first end 37*a*, is positioned near a bushing 27*a*.

Preferably, the first cavity 37 is blind at the second end 37*b*. The temperature transducer 35 has a detection portion 35*a* and is housed in the first cavity 37 such that the detection portion 35*a* is arranged at the second end 37*b* of the first cavity. In this way, the instantaneous temperature of the roller body 21 near the bushing 27 is detected where, due to the rotary motion of the roller body 21 on the bushing 27, a greater increase in temperature is expected in the event of inadequate lubrication of the contact surfaces or of thinning or of wear of the bushing 27.

The second end 37*b* of the first cavity 37 is proximal with respect to the bushing 27, while the first end 37*a* is distal to the bushing and proximal with respect to the housing seat 38. Preferably, the second end 37*b* is not in contact with the outer surface of the bushing 27. For example, it is at a distance from 1 mm to 30 mm, defined in a radial direction (X), from the outer surface of bushing 27.

The first cavity 37 can have a constant radial section along the cavity development axis or have sections of different area or shape always along the development axis thereof. In the example illustrated, the first cavity 37 has a generally cylindrical shape. In the illustrated embodiment, the cavity development axis of the first cavity 37 is oblique with respect to the longitudinal axis Y, forming therewith an angle lower than 900 with respect to the longitudinal axis Y, for example 450.

The temperature transducer 35 is configured to generate an electrical signal representative of the measured temperature. For example, the temperature transducer 35 is a thermal probe, preferably an NTC (Negative Temperature Coefficient) probe having a negative temperature coefficient which causes a decrease in resistance as the temperature increases. Preferably, the thermal probe is adapted to measure temperatures up to about 200° C. The thermal probe typically extends along a main direction and the detection sensitive portion 35*a* is arranged in an end portion thereof.

The roller assembly 20, in particular the roller body 21, comprises a second outer surface 33 which is intended to interact with a work surface (not illustrated) which can for example be the outer surface of another undercarriage component or the ground. In case the undercarriage component is the roller assembly of FIGS. 2-4, the work surface is the surface of another undercarriage component, in particular of the bushings of the links or of the same links of the chain of the belted undercarriage.

In a typical operating position, the second outer surface 33 of the roller body 21, the wear state of which is to be monitored, is the most outer upper surface in the radial direction X.

Preferably, the roller assembly 20 includes a wear transducer 31 for detecting the degree of wear of the second outer surface 33.

The wear transducer 31 is arranged inside the roller body 21. Specifically, the wear transducer 31 is inserted in a second cavity 34 obtained inside the roller body 21. The second cavity 34 is delimited by a lateral wall 34' which extends along a cavity extension axis. The cavity development axis is transverse to the longitudinal axis Y and preferably perpendicular thereto, along the radial direction X. The second cavity 34 may have a substantially cylindrical shape.

In other embodiments not illustrated, the shape of the first cavity 37 and/or of the second cavity 34 may be a right polygonal-based prism, an oblique polygonal-based prism, a truncated pyramid. The first and/or the second cavity 37, 34 may have a constant radial section along the axial cavity development thereof or have radial sections of different area or shape along the axial cavity extension thereof.

The first and the second cavity 34, 37 may be obtained for example by reaming.

The second cavity 34 extends between a first end 34*a* and a second end 34*b* in the cavity development axis. The second cavity 34 has a first opening facing the second outer surface 33 at the first end 34*a*. The first opening defines an inlet section for the second cavity 34. The cavity development axis of the second cavity 34 crosses the first opening 34*a* on the outer surface 33 and extends towards the inside of the roller body 21 up to the second end 34*b* opposite the first end 34*a*. In the case of cavities having a substantially cylindrical shape, the cavity development axis coincides with an axis of symmetry of the second cavity 34. The second cavity 34 has a second opening 12, near or at the second end 34*b*, connected to the seat 38 for the operative and in particular physical connection between the wear sensor 31 and the sensor module 32. In the example of FIGS. 2-4, the seat 38 and the second cavity 34 are connected through a connection cavity 13 with an opening 12 on the second cavity and an opposite opening (not indicated in the figure) on the housing seat 38.

In the example illustrated, the first and the second cavity inside the roller body are separated from each other and are communicating only through the housing seat 38.

The wear transducer 31 is configured to generate an electrical signal representative of a wear parameter. The wear sensor 31 can be of a known type. For example, the wear sensor 31 comprises an electrical circuit which comprises a plurality of electrical elements connected between them in parallel, each of the electrical elements having a predetermined measurable electrical characteristic (details not shown in the figures). The electric elements are, for example, resistors connected between them in parallel, typically equidistant along the electric circuit, and arranged along the direction of development of the cavity. The plurality of electrical elements can be arranged on a substrate having a main extension direction along which it is inserted in the second cavity 34. An example of a wear sensor is described in US 2012/0043980.

The wear transducer 31 is arranged in the cavity so that the electrical elements wear out progressively whenever they come into contact, through the opening on the outer surface 33 of the roller body, with the work surface. The progressive removal of the electrical elements causes a variation of an electrical characteristic, for example the resistance, which corresponds, through a calibration factor, to a quantity representative of the wear, such as the thickness of the roller body worn with respect to the initial position of the outer surface 33.

The wear transducer 31 is operatively connected to the electronic sensor module 32 which is designed for the reception of the signals from the wear transducer and for the transmission of signals representative of wear in wireless mode, further to the reception and transmission of the temperature representative signals, as indicated above.

The sensor device 40 is preferably arranged in a portion 21' of the roller body 21 (indicated in FIG. 3), in particular in a portion of the half-roller 21a.

Preferably, the temperature transducer 35 is arranged, inside the portion 21' of the roller body 21, in a radially inner position with respect to the wear sensor 31. Preferably, the temperature transducer is arranged in a radially inner position with respect to the seat 38 that houses the sensor module 40.

Preferably, the first cavity 37 extends inside the roller body 21, in particular of the half-roller 21a, in a first region of portion 21', while the second cavity 34 extends in a second region of portion 21', wherein the second region is arranged radially externally to the first region of portion 21'. Preferably, the first and second region of portion 21' are contiguous to each other in the radial direction. The radially inner region extends from the surface 18 of the roller body 21, while the second radially outer region comprises the second outer surface 33.

FIG. 4 is a sectional view of a roller assembly that may be monitored by the monitoring system, in accordance with a further embodiment. With respect to the embodiment of FIG. 2, the roller assembly 50 comprises, further to the sensor device 40 described with reference to FIGS. 2-3, a second sensor device 15 arranged in the second half-roller 21b, in particular in a portion 21" of the second half-roller 21b. The portions 21' and 21" are arranged one in front of the other in the longitudinal axis Y. The second sensor device 15 comprises a first cavity 16 for housing in its inside the second temperature transducer and a second cavity 17 for housing a wear transducer (the transducers and the electronic sensor modules inserted in the respective cavities are not illustrated in FIG. 4).

In the example of FIG. 4, the second sensor device 15 is designed and configured like the sensor device 40. The wear sensor housed in the second cavity 17 inside the second half-roller 21b detects the wear of the radially outer surface 33 of the roller body 21, in a different portion thereof with respect to the portion of the surface measured by the wear transducer 31. Similarly, the temperature transducer housed in the first cavity 17 detects the temperature near the bushing 27b so as to monitor two different longitudinal portions of the bushing 27. The first cavity 16 opens onto a seat 14 for housing an electronic sensor module, which can be similar to the electronic sensor module 32. The seat 14 faces an opening of a lateral surface of the half-roller 21b, the lateral surface is an axially outer surface of the half-roller 21b.

Although FIGS. 2-4 refer in particular to a lower roller of belted undercarriage, it is understood that the present invention is not limited to a particular type of roller. For example, the roller assembly can be an upper roller or an idler roller.

Figure 5:
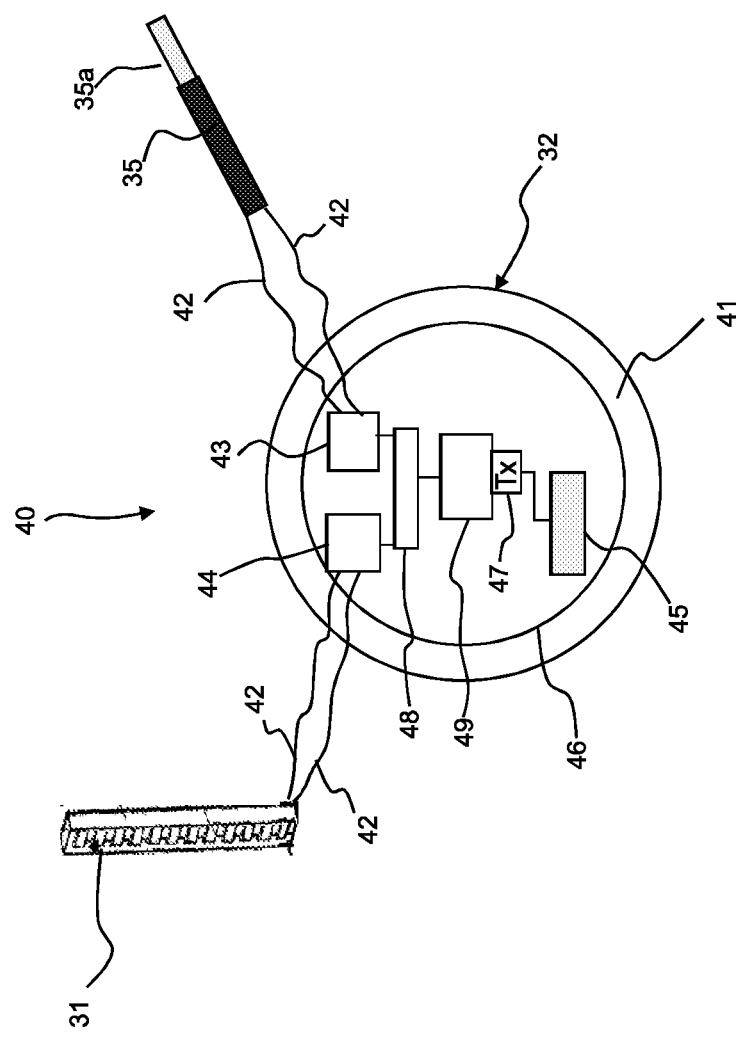
FIG. 5 schematically illustrates an example of an electronic sensor device that can be included in an undercarriage component.

FIG. 5 schematically illustrates an example of a sensor device for monitoring the temperature and preferably also the wear of a roller assembly and in general of an undercarriage component, in accordance with an embodiment. The sensor device 40 comprises an electronic sensor module 32, a temperature transducer 35 and a wear transducer 31. Each transducer 31, 35 is operatively connected to the electronic sensor module 32. The module 32 is arranged inside the undercarriage component, preferably near both the temperature transducer and the wear transducer.

In the usual modes, the temperature transducer 35 is operatively connected to the temperature transmitter 43, by means of electric wires 42 connected to respective coupling terminals of the transducer 35. In the embodiment of FIGS. 2-4, the electric wires 42 are connected to the temperature transmitter 43 through the upper opening of the cavity 37 at the first end 37a.

The electronic sensor module 32 typically comprises one or more electronic boards which include circuit tracks (not shown) on which electrical/electronic devices are mounted. The electronic sensor module 32 comprises a first connector 43 for the electrical connection with the electrical wires 42 to the coupling terminals of the temperature transducer 35 and a second connector 43 for the electrical connection to the coupling terminals of the wear transducer 31.

The electronic sensor module 32 typically comprises circuit components, globally indicated with the number 48, operatively connected to the electrical connectors 42, 43, for the acquisition of the signals coming from the transducers 31, 35 and the output production of electrical signals representative of the measured physical quantity.

The electrical signals representative of a measured physical quantity are indicated in the present description and claims with measurement signals.

The circuit components 48 comprise first circuit components for the management of the signals coming from the temperature transducer 35, which can comprise a conditioning circuit for the analogue signals coming from the temperature transducer 35 and a possible amplifier for converting the input signals into a voltage or current, analogue, or digital output signal. Typically, the electrical signals in output from the circuit components are digital electrical signals. For this purpose, the first circuit components may comprise an analogue-to-digital A/D signal converter. The electrical signals in output from the first circuit components include data representative of the instantaneous temperature measured by the temperature transducer 35 in the roller body 21.

The electronic sensor module 32 comprises a power supply source 41 for powering the electrical circuits and the electrical/electronic devices, such as a button cell battery.

In the embodiments which also include a wear sensor 31 in the roller assembly 20, the circuit components 48 further comprise second circuit components for the management of the signals coming from the wear transducer 31, which may comprise a conditioning circuit of the analogue signals coming from the wear transducer and possible amplifier and A/D converter. The second circuit components are designed to convert the input signal coming from the wear transducer 31 into an analogue or digital voltage or current output signal. Typically, the electrical signals in output from the circuit components are digital signals and include representative data of a wear parameter (instantaneous, i.e., at the instant of the measurement) measured by the wear transducer 31 in the roller body 21.

The electronic sensor module 32 comprises an electronic processor 49, in particular a microprocessor, associated with a memory (not indicated) which receives the measurement signals coming from the circuit components 48 and stores them and then sends them to a wireless transmitter 47 for the transmission in wireless mode of measurement signals via an antenna 45.

The wireless transmitter 47 is configured to generate signals at radio frequency. In particular, the wireless transmitter 47 is a radio frequency transmitter configured to receive from the processor 49, measurement signals which include data representative of temperature and/or of a wear parameter and to generate respective signals at radio frequency (RF) which include representative data of temperature and/or of a wear parameter. The wireless transmitter 47 is operatively connected to an antenna 45 for transmitting the RF signals.

The wireless transmitter 47 may be integrated with the microprocessor 49 in a single electronic component.

The A/D conversion of the measurement signals coming from the transducers may be performed by the microprocessor 49.

The wear parameter is a physical quantity which is determined starting from a measured electrical characteristic, for example the electrical resistance. In ways known per se, the measured electrical resistance is converted by the second circuit components 48 into an electrical voltage signal which is sent to the microprocessor 49. The microprocessor 49 is configured to convert the voltage into a digital physical quantity indicative of the amount of material lost due to wear. The physical quantity may be the surface thickness, for example in millimeters, lost due to wear.

In the example shown in FIG. 5, the electronic sensor module 32 comprises a single printed circuit board (PCB) 46 on which the circuit components 48, the electronic devices 49, 47 and the antenna 45 are mounted for a greater compactness of the sensor module. For example, the antenna 45 is a planar on-chip RF antenna.

In the usual ways, the processor 49 can be configured to activate the measurement by each of the transducers 35, 31 at a preset rate which defines a sampling interval. Typically, the sampling interval of the temperature transducer 35 is lower than the sampling interval of the wear transducer 31. For example, the processor 49 can be configured to command a temperature measurement and therefore to receive a signal representative of the temperature of the roller assembly every 1 or 2 minutes, and to command a measurement indicative of the wear every 12 or 24 hours.

The processor 49 receives from the circuit components 48 measurement signals which include representative data of a wear parameter and measurement signals representative of the temperature, separately. The received signals can be sent to the wireless transmitter 47 independently of each other and then transmitted in wireless mode as separate radio signals.

Typically, the radio signals including data use a packet communication technology, in which the radio signals are transmitted in data packets. Preferably, the processor 49 is configured to create data packets including data representative of the wear and temperature parameter included in the measurement signals received at a certain instant by the transducers 31, 25. The data packets are sent to the wireless transmitter 47 which transmits them in wireless mode.

Preferably, the wireless transmitter 47 is configured to generate short-range radio signals, in particular with an action range of about 5 meters to about 20 meters. In a particularly preferred embodiment, the wireless transmitter 47 uses BLUETOOTH® Low Energy technology with low power consumption.

Preferably, the wireless transmitter 47 is configured to send the RF signals in connectionless broadcasting mode. As is generally known, in this mode the communication channel is unidirectional, without confirmation of reception of the message, so that the signals sent can be received by any listening device or configured to receive signals in the same communication channel that is at a useful distance to receive them.

For example, the BLE communication channel is on the 2.4 GHz band. Typically, the wireless transmitter 47 transmits the RF signals which include data representative of the temperature inside the roller assembly periodically, for example every 10 seconds.

Figure 6:
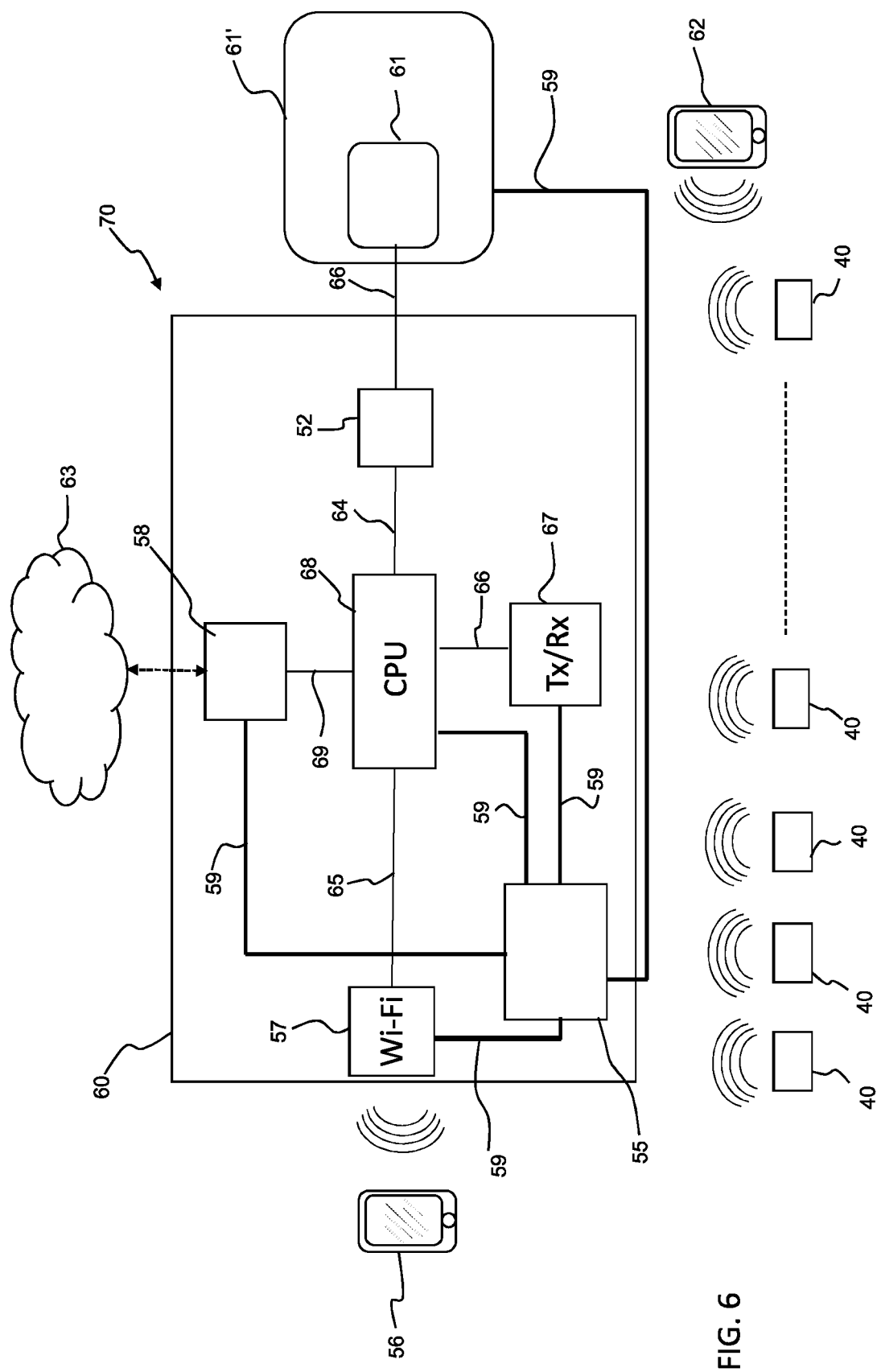
FIG. 6 is a block diagram of a temperature and possibly wear monitoring system of a plurality of undercarriage components in accordance with an embodiment.

FIG. 6 is a block diagram of a temperature monitoring system of a plurality of undercarriage components in accordance with an embodiment. For example, the plurality of undercarriage components may be a plurality of lower roller assemblies described with reference to FIGS. 2-4.

Each undercarriage component is in its inside provided with a sensor device 40 configured to detect at least one physical quantity and to generate a wireless measurement signal which includes data representative of the at least one physical quantity measured. The at least one physical quantity comprises the temperature and the wireless measurement signal includes data representative of the detected temperature. The electronic sensor module is mounted on the undercarriage component so as to be facing outwards from the undercarriage component and preferably near a temperature transducer.

In particular, the sensor device may be in accordance with what is described with reference to FIGS. 2-5.

The electronic sensor module is connected to at least one transducer for measuring a physical quantity which, by means of a respective transmitter connected thereto, generates an electrical signal representative of the measured quantity and comprises a wireless transmitter operatively connected to the at least one transducer, typically by means of a microprocessor, and configured to receive the electrical signals representative of the physical quantity measured and to transmit in wireless mode measurement signals which include data representative of the physical quantity. Preferably, the wireless measurement signals are radio signals, preferably signals at radio frequency (RF). Preferably, the wireless transmitter of each sensor device 40 is configured to periodically transmit the radio signals including temperature representative data in connectionless broadcast mode.

In particular, the wireless transmitter of the sensor device 40 is a BLUETOOTH® transmitter, preferably BLUETOOTH® Low Energy.

The wireless measurement signals transmitted by the sensor device 40 include data representative of a quantity from the at least one transducer of the sensor device. In particular, the at least one transducer comprises a temperature transducer and the measured quantity is an instantaneous temperature value, i.e., at the measurement instant. Alternatively, the temperature value may be an average value, or a maximum temperature value of values measured in a predetermined time interval. In another example, the wireless measurement signals may include both an instantaneous temperature value and a maximum temperature value. The predetermined time interval may be selected as a function of the periodicity of transmission of the radio signals from the sensor device.

The sensor device 40 may be in accordance with the embodiment of FIG. 5.

Although the embodiments shown in the figures make particular reference to the management of signals related to temperature and, preferably, to wear, it is understood that the monitoring system as described therein can be configured to receive signals related only to wear or to other physical quantities measured in the undercarriage components.

With reference to FIG. 6, the monitoring system 70 comprises a gateway 60 in wireless communication with the sensor devices 40 arranged in respective undercarriage components. For this purpose, the gateway 60 comprises a gateway wireless transceiver 67 configured to receive the radio signals from the sensor devices 40 of the plurality of sensor devices.

In implementing examples, the BLUETOOTH® Low Energy signals transmitted periodically by the plurality of sensor devices 40 are received by the gateway wireless transceiver 67 and transmitted to a central processing unit 68, for example a microcontroller, for example an ESP 32. The central processing unit 68 typically comprises a non-volatile memory, on which the measurement signals received by the gateway wireless transceiver 67 are stored.

In the usual ways, the central processing unit 68 and the gateway wireless transceiver 67 communicate using a respective physical layer interface with which they are provided (not indicated in the figure) by means of electrical lines 66 for data reception/transmission. For example, the physical layer interface is a UART interface (Universal Asynchronous Receiver Transmitter).

The gateway 60 comprises a wireless access point 57 configured to act as an entry point to the data related to the measurement signals that are stored in the central processing unit 68.

The measurement signals, possibly in the form of data packets, transmitted by each sensor device 40 are received by the gateway transceiver 67 which is configured to transmit them to the central processing unit 68. The latter, upon receiving the measurement signals, transmits them to the wireless access point 57.

The wireless access point 57 is configured to generate medium range wireless signals, in particular with an action range of about 20 meters to about 500 meters.

Preferably, the wireless access point 57 is configured to generate Wi-Fi radio signals, for example in accordance with the standard IEEE 802.11 communication protocols. The range covered by Wi-Fi® signals can be 100-150 meters in the outdoor environment, in a typical use when the gateway is installed in or near the belted vehicle.

As is generally known, the wireless access point 57 typically comprises a processor for receiving the measurement signals from the central processing unit 68 and for storing them in a memory associated with the processor and a Wi-Fi® transceiver configured to receive the measurement signals from the processor and transmit them in wireless mode via a Wi-Fi® antenna.

The central processing unit 68 is operatively connected to the wireless access point 57, in particular through a physical layer interface with which the Wi-Fi® access point 57 is provided, in particular a UART interface through electrical lines 65 for data reception/transmission.

In this way, any client terminal 56 provided with Wi-Fi® connectivity, for example a smartphone, tablet, or PC, can connect to the Wi-Fi® access point 57, which acts as a hotspot, by means of a known authentication procedure and request the access to the data related to the measurement signals stored in the central processing unit 68 of the gateway 60.

Preferably, the wireless access point 57 may be configured to operate simultaneously from both an access point and a Wi-Fi® station. When operating as a Wi-Fi® station, the access point 57 is configured to transmit the data stored in the central processing unit 68 to another wireless access point outside the gateway 60.

Preferably, the central processing unit 68 is in communication with a wireless communication module for transmitting the measurement signals received by the gateway wireless transceiver 67 to a remote server or terminal via a mobile telecommunication network. Preferably, the gateway 60 comprises a mobile connection module 58 for the connection with a mobile telecommunication network 63 (2G, 3G, 4G, LTE . . . ). The mobile connection module 58 is in particular, a cellular wireless modem which typically integrates a SIM card which includes the user identification code (elements not indicated in the figure). The central processing unit 68 is operatively connected to the cellular wireless modem 58. As is generally known, the cellular wireless modem 58 modulates/demodulates the measurement signals received by the central processing unit so as to generate respective measurement signals in a cellular telecommunication network 63.

Through the cellular telecommunication network 63, the measurement signals can be transmitted from the module 58 to a remote server or to the mobile terminal of an operator located at any distance from the measurement site. In the usual ways, the cellular wireless modem 58 is provided with a physical layer interface (e.g., UART) for the communication via electrical lines 69 for data reception/transmission with the physical layer interface of the central processing unit 68.

The measurement signals transmitted by the mobile connection module 58 can be received remotely by a server (not indicated) and for example displayed by an operator.

The gateway 60 is arranged near the belted undercarriage, wherein a plurality of undercarriage components comprises respective sensor devices 40, at a distance therefrom such as to allow the reception of the measurement signals by the gateway 60. The distance generally depends on the wireless communication technology and the power of the signals emitted. In the case of BLUETOOTH® Low Energy radio signals, the distance is typically between 5 and 50 meters.

The gateway 60 can be arranged inside a vehicle mounted on the belted undercarriage. Since belted vehicles are normally subjected to high stresses, it is preferable that the gateway is enclosed in a box made of sturdy material for the protection of the electronic devices.

Typically, the vehicles are provided with a CAN (Controller Area Network) on-board communication network, also referred to as a CAN-BUS network that uses a standardized communication protocol (CAN protocol) that uses a serial data transfer for the communication between the microcontrollers and electronic devices mounted in the vehicle and detecting vehicle parameters (brakes, engine temperature, battery, headlights, etc.). The vehicle 61' (indicated schematically in FIG. 6) comprises an on-board communication network 61.

Preferably, the gateway 60 comprises a CAN controller 52 configured to convert the data associated with the measurement signals that are stored in the central processing unit 68 into data associated with the measurement signals compliant with the CAN protocol. The CAN controller 52 is operatively connected to the central processing unit 68 by means of electrical lines 64. For this purpose, the central processing unit 68 and the CAN controller 52 comprise a respective physical layer interface for communication, for example an SPI (Serial Peripheral Interface).

The CAN 52 controller is connected to the CAN 61 on-board communication network, typically via CAN network cables 66. Typically, the CAN-BUS network is connected to one or more on-board displays for the display of functional parameters and control warning lights. The measurement signals sent to the CAN device 61 can for example be displayed by an operator on board the vehicle.

In one embodiment, the electronic devices of the gateway are powered with current by a power supply module 55 by means of electrical lines 59.

In one embodiment, the power supply module 55 is a battery.

In a different embodiment, the power supply module 55 is a DC/DC voltage converter connected to the on-board power supply network of the vehicle 61' by means of the electrical line 59 and is configured to convert the voltage of the on-board power supply network, typically from 9V to 36V, into a voltage suitable for the operation of the electronic devices of the gateway 60, for example of 3.3 V.

Gateway 60 is preferably implemented on a printed circuit board (PCB). In particular, the gateway wireless transceiver 67, the Wi-Fi® wireless access point 57 and, if present, the mobile connection module, and the CAN controller 52, are mounted on a single PCB. Preferably, the power supply module 55 is mounted on the same PCB.

The measurement signals transmitted by the sensor devices 40 in BLUETOOTH® mode can be received by a cellular terminal or a portable device 62, which is located near the belted undercarriage and is in communication with the sensor devices 40 in BLUETOOTH® mode.

Preferably, the measurement signals transmitted by each sensor device 40 include a respective sensor device identifier. The measurement signals which include data representative of at least one measured quantity are stored in the central processing unit 68 in association with the respective sensor device identifiers 40.

Advantageously, the monitoring system allows the management of the measurement signals of a plurality of sensor devices in the belted vehicle in real time both remotely and near the sensor devices, by means of a single wireless connection with the respective sensor devices.

The present disclosure also relates to an undercarriage component which comprises a sensor device.

Preferably, the undercarriage component is a roller assembly which comprises:
 a roller body which extends along a longitudinal axis Y and comprises a central hole that axially crosses the roller body and is configured to receive a shaft, the roller body being able to rotate around the shaft;
 a first cavity obtained inside the roller body which houses in its inside a temperature transducer, the first cavity extending inside the roller body along a cavity development axis and being open at a first end in the direction of the cavity development axis for the insertion of the temperature transducer, wherein
 the first cavity is connected to a housing seat through the opening of the first cavity end, the housing seat being obtained in the roller body as a recess that faces an opening of a first outer surface of the roller body, the housing seat housing an electronic sensor module operatively connected to the temperature transducer through the first end of the first cavity.

Preferably, the electronic sensor module is configured to receive signals from the temperature transducer and to generate and transmit signals in wireless mode including temperature representative data.

Preferably, the electronic sensor module comprises: a power supply source, circuit components operatively connected to the temperature transducer, an electronic processor operatively connected to the circuit components, and a wireless transmitter operatively connected to the electronic processor so as to receive respective measurement signals including temperature representative data, the wireless transmitter generating corresponding measurement signals in wireless mode including temperature representative data.

Preferably, the sensor device is configured to detect, further to the temperature inside the roller assembly, the wear of an outer surface of the roller assembly, wherein the sensor device comprises a wear transducer housed in a second cavity obtained inside the roller body and operatively connected to the electronic sensor module, the second cavity having a first opening placed at a second outer surface of the roller body, wherein the wear transducer is configured to generate a signal representative of a wear parameter of the outer surface.

Preferably, the wear transducer comprises a first transducer end placed at the first opening of the second cavity.

Preferably, the electronic processor of the electronic sensor module is configured to receive measurement signals from the wear transducer further to measurement signals from the temperature transducer, and the wireless transmitter is configured to generate corresponding measurement signals in wireless mode that include representative data of a wear parameter and/or temperature representative data of the respective roller assembly.

Preferably, the roller assembly comprises a bushing fitted on the outer surface of the shaft so as to be interposed between the outer surface of the shaft and the radially inner surface of the roller body, the roller body being mechanically coupled to the shaft through the bushing.

Preferably, the first cavity has a first open end and a second end opposite the first end along a cavity development axis, the first cavity being connected to the housing seat through the opening of the first end and the second end being arranged near the bushing. Preferably, the first cavity is blind at the second end.

The sensor device as described in the present embodiments can allow the housing thereof in a movable part of an undercarriage component, such as a roller body which rotates around a fixed shaft. The arrangement of a single electronic sensor module for the transmission of data related to the temperature inside the undercarriage component and to data related to another physical quantity, such as a physical quantity indicative of a state of wear of the undercarriage component, increases the compactness, making it possible to fully monitor a movable part of an undercarriage component.

The person skilled in the art will recognize that it is possible to combine the various characteristics of the embodiments described above to obtain further embodiments, all falling within the scope of the present invention as defined by the subsequent claims.

The invention claimed is:

1. A monitoring system of at least one physical quantity which measures a temperature in at least one undercarriage component, the system comprising:
 at least one sensor device arranged in a respective undercarriage component for a belted undercarriage of a vehicle and wherein the at least one sensor device comprises:
  a first sensor in a first cavity within the at least one undercarriage component;
  a second sensor in a second cavity within the at least one undercarriage component;
  an electronic sensor module in operative communication with the first sensor and with the second sensor; and
  wherein the at least one sensor device is configured to detect the temperature inside the at least one undercarriage component and to generate wireless measurement signals that include temperature representative data;

a gateway that comprises:
    a gateway wireless transceiver for receiving the wireless measurement signals from the at least one sensor device;
    a central processing unit operatively connected to the gateway wireless transceiver and configured to receive and store the wireless measurement signals including the temperature representative data associated with the at least one sensor device, and
    a wireless access point operatively connected to the central processing unit and configured to receive said wireless measurement signals stored in the central processing unit and to generate corresponding wireless measurement signals, the wireless access point acting as an entry point for accessing the temperature representative data detected by the at least one sensor device,
    wherein the at least one undercarriage component is a roller assembly which comprises a roller body having a central axis and a central hole that axially crosses the roller body and is configured to receive a shaft, wherein the first cavity comprises an axis that is oriented at an acute angle with respect to the central axis of the roller body; and
    wherein the second sensor is configured to detect wear of an outer surface of the at least one undercarriage component, and wherein the second cavity is oriented perpendicular to the central axis of the roller body, and further wherein the second sensor comprises a wear transducer, and wherein a wireless transmitter of the at least one sensor device is configured to generate the wireless measurement signals that include at least one of representative data of a wear parameter.

2. The monitoring system according to claim 1, wherein the corresponding wireless measurement signals generated by the wireless access point are medium range radio signals with an action range of 20 metres to 500 metres.

3. The monitoring system according to claim 1, wherein the wireless measurement signals generated by the at least one sensor device are short-range radio signals transmitted in connectionless broadcast mode.

4. The monitoring system according to claim 3, wherein the short-range radio signals are on the 2.4 GHz band.

5. The monitoring system according to claim 3, wherein the gateway is arranged in an action range of the short-range signals generated by the at least one sensor device so as to allow the wireless gateway transceiver to receive the wireless measurement signals from the at least one sensor device.

6. The monitoring system according to claim 1, wherein the gateway comprises a wireless cellular modem connected to the central processing unit and configured to receive the wireless measurement signals from the central processing unit and to generate the corresponding wireless measurement signals at a radio frequency for a mobile telecommunications network, the wireless measurement signals including the temperature representative data of the at least one undercarriage component.

7. The monitoring system according to claim 1, wherein the at least one sensor device comprises a plurality of sensor devices arranged inside respective undercarriage components, each sensor device being configured to detect a temperature inside the respective undercarriage component and to generate a wireless measurement signal including temperature representative data for the respective undercarriage component.

8. The monitoring system according to claim 1, wherein the at least one undercarriage component is arranged in the belted undercarriage and the gateway is arranged in the vehicle.

9. The monitoring system according to claim 8, wherein the gateway comprises a CAN controller operatively connected to the central processing unit for a reception of the temperature representative data measured by the at least one sensor device and associated with the wireless measurement signals including the temperature representative data stored in the central processing unit, the CAN controller being operatively connected to a communication network on board the vehicle.

10. The monitoring system according to claim 1, wherein the first sensor comprises a temperature transducer and wherein the electronic sensor module comprises a wireless transmitter configured to generate the wireless measurement signals that include the temperature representative data.

11. The monitoring system according to claim 1, wherein the second sensor is in a second cavity, the second cavity has a first opening placed at the outer surface of the at least one undercarriage component and the wear transducer comprises a first transducer end placed at the first opening of the second cavity.

12. A monitoring system of at least one physical quantity which measures a temperature in at least one undercarriage component, the system comprising:
    at least one sensor device arranged in a respective undercarriage component for a belted undercarriage of a vehicle and wherein the at least one sensor device comprises:
        a first sensor in a first cavity within the at least one undercarriage component;
        a second sensor in a second cavity within the at least one undercarriage component;
        an electronic sensor module in operative communication with the first sensor and with the second sensor; and
        wherein the at least one sensor device is configured to detect the temperature inside the at least one undercarriage component and to generate wireless measurement signals that include temperature representative data;
    a gateway that comprises:
        a gateway wireless transceiver for receiving the wireless measurement signals from the at least one sensor device;
        a central processing unit operatively connected to the gateway wireless transceiver and configured to receive and store the wireless measurement signals including the temperature representative data associated with the at least one sensor device;
    a wireless access point operatively connected to the central processing unit and configured to receive said wireless measurement signals stored in the central processing unit and to generate corresponding wireless measurement signals, the wireless access point acting as an entry point for accessing the temperature representative data detected by the at least one sensor device; and
    wherein the at least one undercarriage component is a roller assembly which comprises a roller body having a central axis and a central hole that axially crosses the roller body and is configured to receive a shaft, wherein the first cavity comprises first cavity axis that is horizontally aligned with respect to the central axis of the at least one undercarriage component and is oriented at an acute angle with respect to the central axis of the at least one undercarriage component, and wherein the second cavity comprises a second cavity axis that is horizontally and vertically aligned with respect to the central axis of the at least one undercarriage component;

wherein the second sensor is configured to detect wear of an outer surface of the at least one undercarriage component, and wherein the second cavity is oriented perpendicular to the central axis of the roller body, and further wherein the second sensor comprises a wear transducer, and wherein a wireless transmitter of the at least one sensor device is configured to generate the wireless measurement signals that include at least one of representative data of a wear parameter.

* * * * *